United States Patent [19]

Bergler

[11] Patent Number: 4,584,772
[45] Date of Patent: Apr. 29, 1986

[54] HAND-HELD PLANING TOOL WITH A ROTARY CUTTER

[75] Inventor: Otto Bergler, Mühlacker-Lomersheim, Fed. Rep. of Germany

[73] Assignee: Black & Decker Overseas AG, Vaduz, Liechtenstein

[21] Appl. No.: 609,222

[22] Filed: May 11, 1984

[30] Foreign Application Priority Data

May 24, 1983 [DE] Fed. Rep. of Germany ....... 3318844
Dec. 13, 1983 [DE] Fed. Rep. of Germany ....... 3344962

[51] Int. Cl.⁴ .............................................. B27C 1/10
[52] U.S. Cl. ...................................... 30/475; 30/478; 30/481; 30/490
[58] Field of Search .................. 145/4, 20, 15, 5 R

[56] References Cited

U.S. PATENT DOCUMENTS

| | | |
|---|---|---|
| 102,406 | 4/1870 | Katz ................... 145/5 R |
| 468,362 | 2/1892 | Phelps ................ 145/5 R |
| 721,771 | 3/1903 | Allen .................. 145/5 R |
| 778,921 | 1/1905 | Traut ................... 145/20 |
| 820,639 | 5/1906 | Gabrielson ........... 145/20 |
| 917,915 | 4/1909 | Vander Toorn . |
| 984,083 | 2/1911 | Faber .................. 145/5 R |
| 1,021,631 | 3/1912 | Savage . |
| 1,206,461 | 11/1916 | Nickelson . |
| 1,249,674 | 12/1917 | Schade . |
| 1,357,985 | 11/1920 | Impalea ................ 145/4 |
| 1,426,739 | 8/1922 | Hoy et al. ............ 145/4 |
| 1,699,395 | 1/1929 | Johansson ........... 145/20 |
| 1,706,157 | 3/1929 | Hannah ............... 145/4 |
| 1,723,951 | 8/1929 | Potter . |
| 1,900,336 | 3/1933 | Egan . |
| 1,911,179 | 5/1933 | Calleja . |
| 2,344,897 | 3/1944 | Pringle . |

FOREIGN PATENT DOCUMENTS

| | | |
|---|---|---|
| 167040 | 1/1906 | Fed. Rep. of Germany . |
| 835525 | 2/1952 | Fed. Rep. of Germany . |
| 2018575 | 10/1971 | Fed. Rep. of Germany . |
| 2552484 | 5/1977 | Fed. Rep. of Germany . |
| 3109361 | 10/1982 | Fed. Rep. of Germany . |
| 1059785 | 3/1954 | France . |
| 297501 | 6/1954 | Switzerland . |
| 297502 | 6/1954 | Switzerland . |
| 7955 | of 1893 | United Kingdom ............... 145/5 R |

OTHER PUBLICATIONS

Prechtl's Tech. Encyklopaedie, Stuttgart 1836-1837, Plate 148, vol. 7-8.

Primary Examiner—Frederick R. Schmidt
Assistant Examiner—J. T. Zatarga
Attorney, Agent, or Firm—Burns, Doane, Swecker & Mathis

[57] ABSTRACT

A hand-held planing tool has a housing with a chamber adapted to receive a rotary driven planer head. The chamber is sized to receive either a small planer head and blade which makes a shallow flat planar cut in a workpiece, or a larger planer head and blade which makes a profiling cut (e.g., an irregular cut) in a workpiece. The housing carries support members which extend downwardly to different depths to contact the portions of the profiling cut which are of corresponding depths, and thereby adapt the tool to travel along the profile.

17 Claims, 17 Drawing Figures

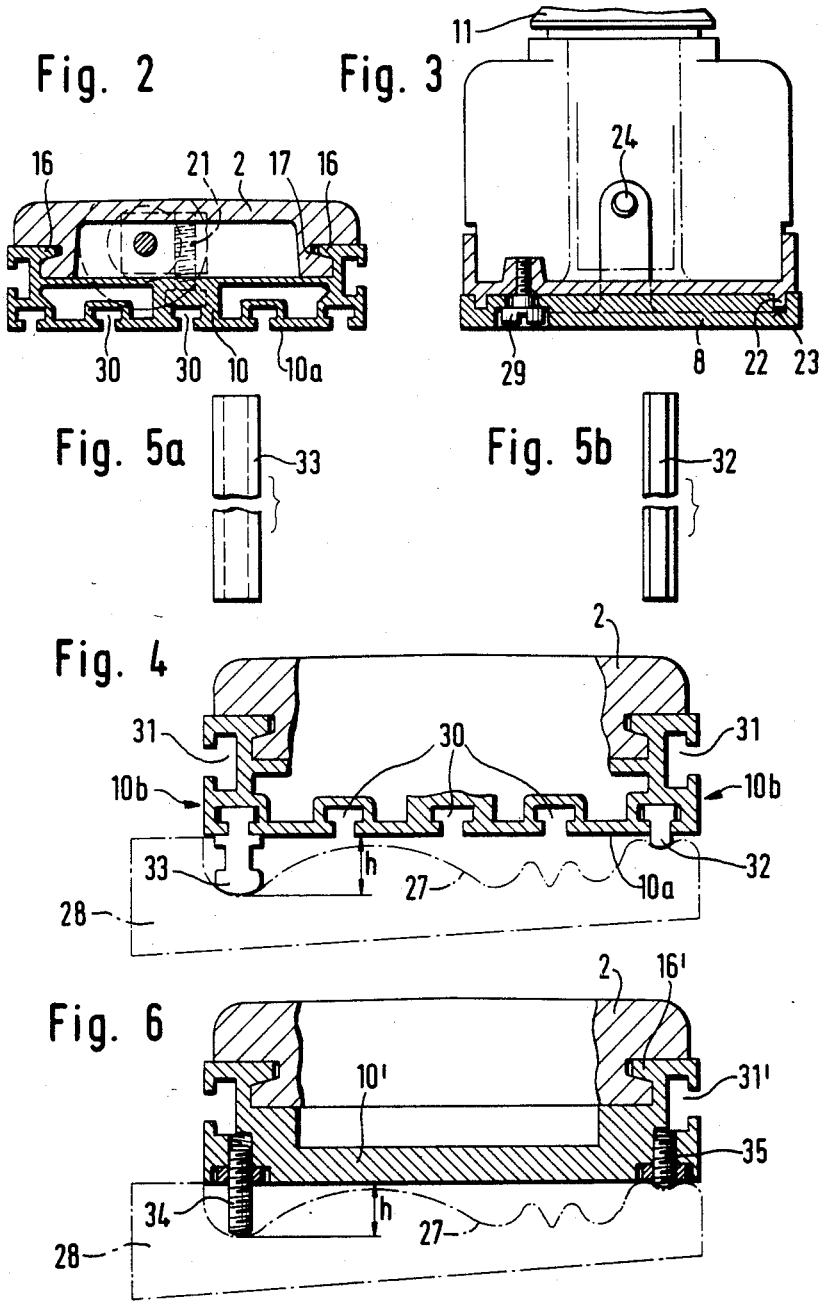

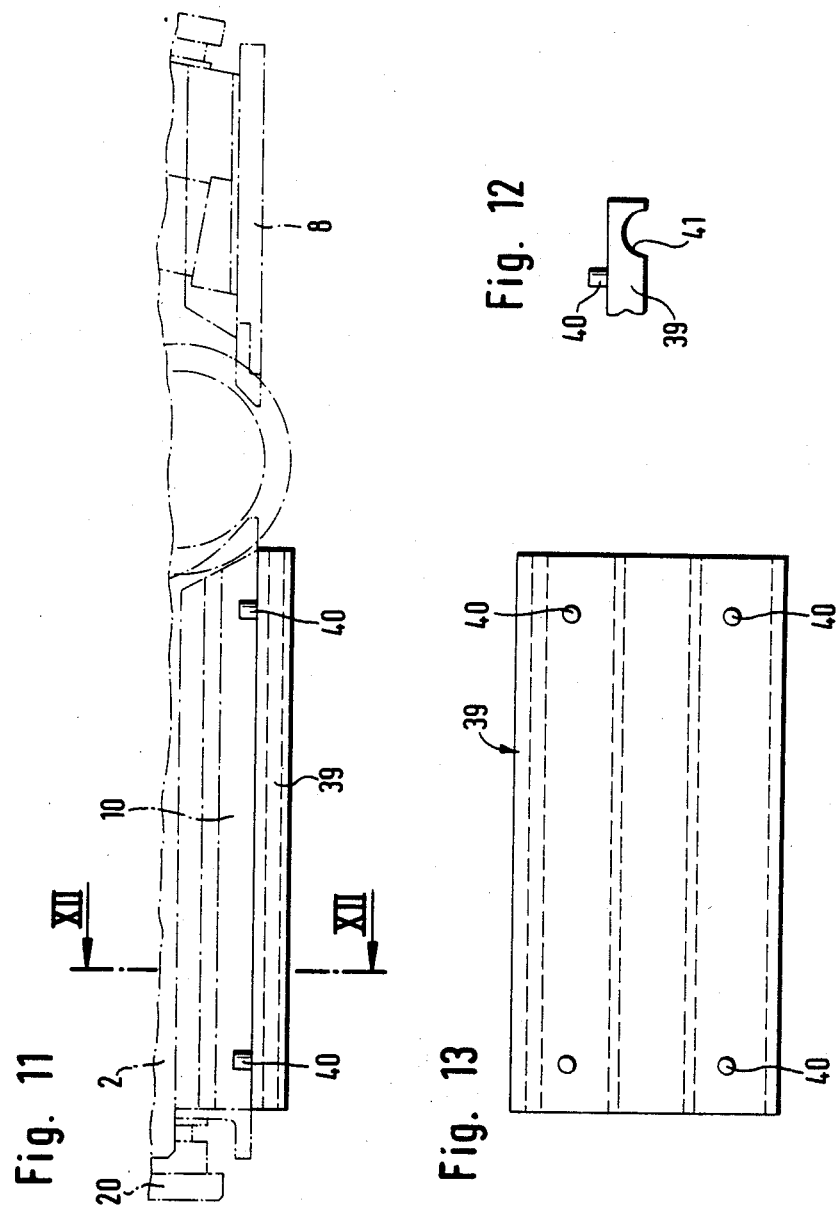

HAND-HELD PLANING TOOL WITH A ROTARY CUTTER

BACKGROUND AND OBJECTS OF THE INVENTION

The invention concerns a hand-held planing tool having a drive shaft driven by an electric motor to rotate a bladed planer head.

The planer head rotates in a cylindrical planing chamber which is provided in a housing and is open in the downward direction. The downward opening is bordered in a direction transverse to the feed direction by (i) the rear edge of a feed plate, the latter being adjustable in height, and (ii) the front edge of the discharge plate. The axis of the planer head is arranged in a fixed position with respect to a bottom surface of the tool.

Known manual planing tools of this type have been capable heretofore of planar cutting only. The planer base of the discharge table or the discharge plate, respectively, is aligned tangentially with the circle of rotation of the plane cutter, so that essentially only planar work or fitting work on window frames or the planing of doors or the like, are possible. This is in essence also true for special designs of planing tools, such as for example, a rough plane, the base of which, while it has a certain profile, is again essentially parallel to the rotating circle of the cutter, whereby merely certain points of the shaping cutter are penetrating to a depth of approximately 1 mm into the surface to be processed, in order to obtain a rustic appearance. In the case of the so-called barrel plane the rear base is again aligned with the circle of rotation of the planer cutter, wherein, however, the feed table and the discharge table are in the form of curved guide surfaces, the radii of curvature whereof are adjustable.

In the known planing tools the cylindrical chamber for the planer head is arranged and laid out so that it corresponds approximately to the diameter of the planer head and its slightly protruding cutter baldes, with the axis of the chamber being located so that its lower limit extends into a narrow slit between the chipbreaking rear edge of the feed table and the front edge of the discharge table, the planer base whereof is tangential to the diameter of the rotating circle of the planer cutter. The narrow, slit-like orifice is provided for safety reasons so that the hands of an operator cannot be seized accidentally by the rotating planer head and its cutting blades. In view of this layout of conventional manual planer tools, profile shaping is not possible, as it is not feasible to let a substantial cutter circumference extend from the orifice in the downward direction. For the shaping of moldings or the surface of beams or the like, therefore stationary milling machines are used, which are expensive. Even though planer tools for the shaping of profiles are known (U.S. Pat. No. 1,206,461), straight line guidance can be obtained with them by using separate lateral guides only. The guidance of the profile produced itself is not possible and not intended.

It is an object of the invention to provide a manual planer tool of the above-mentioned type so that profile shaping work is possible, whereby molding shapes may be produced by do-it-yourself workers or in mobile applications on construction sites or the like.

SUMMARY OF THE INVENTION

The present invention involves sizing the chamber which receives the planer head sufficiently large to receive either a smaller planer head and blade for making flat cuts, or a larger planer head and blade for making profile cuts. The housing carries removable supports which project below the guide surface of the housing to different depths to adapt the tool to follow the profiling cuts, the latter having portions of different depths which correspond to the depths of the supports.

The configuration according to the invention makes it possible to use shape cutters in the planer head, the profile whereof may have a certain predetermined height, without the planer chamber and the outlet opening preventing the arrangement of such cutters, and whereby the housing is adapted to properly track the profiling. It is advantageous, in order to achieve a satisfactory planing operation without interference, to render the feed plate and the discharge plate adjustable in the direction of advance (i.e., the fore-aft axis), so that they may be adapted to the shape to be produced. The feed plate may have a chipbreaking edge, and the discharge plate may have a front edge, which edges comprise portions of removable members. The contours of those edges are adapted to the rotating circle of the shape to be executed. If the removable edge members are made of a material that can be cut by the planer cutter, it is further possible to employ the rotating planer head and its shape cutters to cut the profile into the edge members so that optimum chipbreaking action and secure guidance of the planing process are obtained. To adjust the discharge plate and the feed plate, it is advantageous to join them positively to the housing of the manual plane and displace them by means of adjusting spindles which may be actuated from the front and the rear, respectively, so a sensitive and simple adjustment procedure is obtained.

In order to guide such a manual plane, so that initially the planer base is recessed with respect to the outermost rotating circle diameter of the planer head, it is advantageous to equip the discharge plate with a device for at least a partial adaptation to the depth of the profile to be produced. This device may consist of recesses in the planer base, into which are set shapes that are adapted to at least parts of the profile depth. Thus, for example, the recesses may consist of longitudinal grooves extending in the advance direction with a dovetail or T-shape configuration into which the support shapes may be inserted; the supports are in the form of guide gibs of a height corresponding to the depth of profiles. In the production of a full profile, i.e., a profile in which no part of the finished shape is extending at the height at which the feed table and discharge material are also arranged approximately, at least two of such gibs may be provided. In case of partial shaping, a single gib may be sufficient, while the planer base itself may be guided on another part of the finished profile.

It is also possible to provide support shapes in the form of partial pieces extending transversely to the advance direction or as interchangeable plates corresponding to the length of the planer base and equipped with the negative contour of the profile to be produced. It is further possible to provide a plurality of adjusting pins projecting vertically from the planer base and being adjustable in length, for example, as threaded pins, so that the necessary guidance on the planer base may be obtained in this manner.

It has been found that profile recesses along straight lines cannot always be produced by a chip-forming process as the capacity of the manual planer tool permits chip-forming to a certain depth only. Excessive cutting depth would lead to inaccuracies or even to undesirable oscillation contours in the finished shape. It is therefore advantageous to lay-out the feed plate in a manner so that its planer base is adjustable to the planing depth that the planer head is capable of producing. This may be accomplished in a very simple fashion by inserting guide gibs or the like in the planer base of the feed plate. It is simpler and more effective to apply profile plates to the planer base of the feed plate, such as those already provided for the planer base of the discharge plate. The simplest and most appropriate configuration consists, however, of designing the planer plate of the feed plate and optionally also the planer base of the discharge plate as a unit removable from the housing and attaching in individual cases the planer base plates fitted to a given shape planer head, by means of lock fasteners to the housing. This configuration permits the rapid and simple exchange and fitting of the planer bases for the application desired. It is further advantageous to orient the front part of the housing with the feed plate located in front of the planer head pivotable in the upward direction, so that the front planer base is readily accessible and thus easily replaced. In a stationary use of such planer tools at least the front planer base may therefore be exchanged easily and in a simple manner. In order to prevent the upward pivoting of the pivotable front part of the housing in the operating position, said front part may be secured by a locking fastener on the housing.

THE DRAWING

The objects and advantages of the invention will become apparent from the following detailed description of preferred embodiments thereof in connection with the accompanying drawings in which like numerals designate like elements, and in which:

FIG. 2 is a partial sectional view taken along line II of FIG. 1;

FIG. 3 is a partial sectional view taken along line III of FIG. 1;

FIG. 4 is a partial section similar to FIG. 2 taken through the discharge table of the manual planer tool with the specially designed planer base, wherein the guide gibs are inserted as support profiles on the finished shape;

FIGS. 5a and 5b are top views of the guide gibs after they have been inserted;

FIG. 6 is a sectional view similar to FIG. 4 but with a different planer base;

FIG. 11 is a partial view of the manual planer tool of FIG. 1 in the area of the planer base with a profile plate used as a support;

FIG. 12 is a partial sectional view through the profile plate of FIG. 11 taken along the line XII;

FIG. 13 is a top view of the profiled plate of FIG. 11, inserted in the planer base;

DETAILED DESCRIPTION OF PREFERRED EMBODIMENTS OF THE INVENTION

Figure 1:
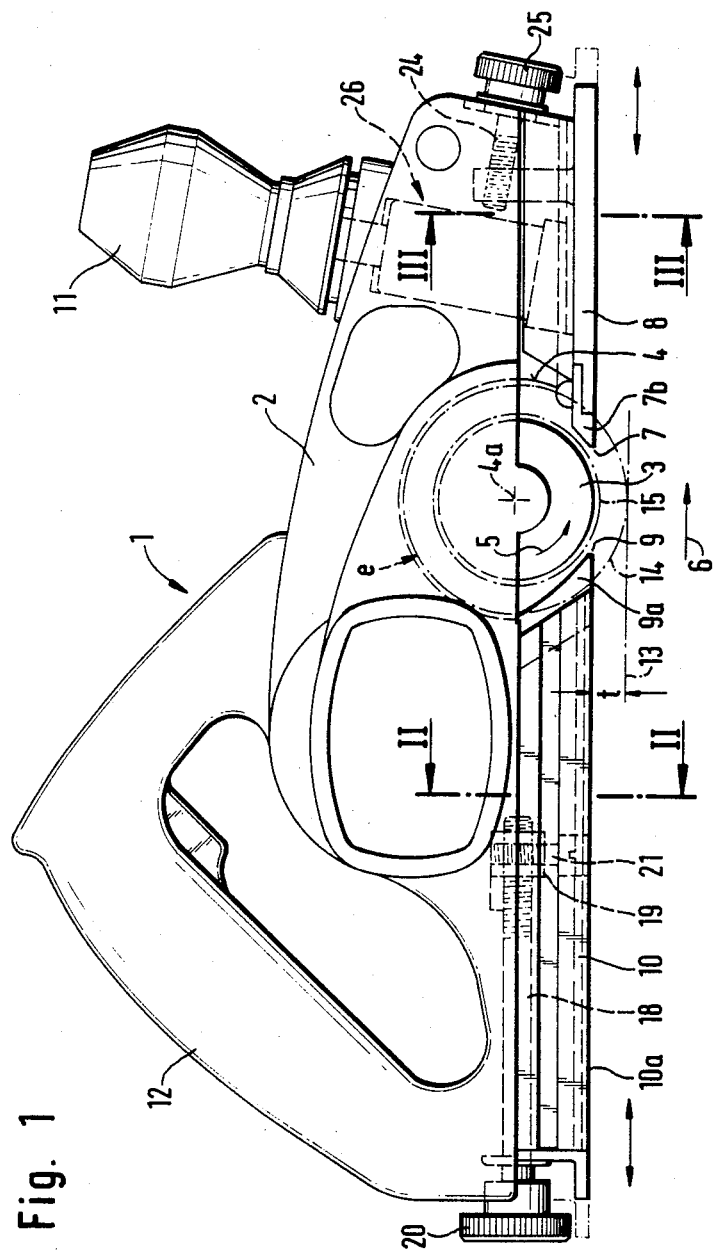
FIG. 1 depicts a schematic lateral elevation of a hand-held plane according to the invention.

FIG. 1 shows a manual or hand-held plane 1 having a housing 2 in which is disposed an electric motor (not shown) acting as the drive for a rotating bladed planer head 3. The latter is driven rotatingly in the direction of arrow 5 within a cylindrical planer chamber 4 located in the housing 2. The plane is advanced relative to a workpiece in a forward direction 6 during a planing operation. A feed plate 8 is disposed forwardly of the planer head 3, and a discharge plate 10 is disposed behind the planer head 3. The transverse borders of the cylindrical planer chamber 4 are defined by a rear edge 7 of the feed plate 8 and by a front edge 9 of the discharge plate 10. Preferably, the edges 7, 9 are formed by exchangeable edge parts 7b or 9a, respectively, which are inserted into (in a manner not shown in detail) and positively fastened onto main parts of the feed plate 8 and discharge plate 10, respectively. The bladed planer head 3 is thus mounted between the edges 7, 9 such that the blades project downwardly beyond the edges 7, 9 to effect the processing.

During processing, the manual plane is gripped by the guide knob 11 and/or the manual handle 12, respectively, in a known manner and advanced over the workpiece in the direction of the arrow 6. It is obviously also possible to arrange the manual plane 1 with its bottom side stationary, whereupon the workpiece could be moved over the plane in a direction opposite to the direction 6.

The cylindrical planer chamber 4 has a rotary axis 4a positioned with respect to the discharge table 10 and its planer base 10a, so that a tangent 13 to the periphery of the planer head 3 (i.e., the periphery defined by the outer edges of the blades, and extending parallel to the planer base 10a, is spaced by a distance t from the planer base 10a in the downward direction. The distance t corresponds to the maximum profile depth of cut attainable with the plane 1, resulting from the diameter 14 of the rotating circle described by the shape cutters set into the planer head 3. This diameter 14 of the circle of rotation is always slightly smaller than the diameter of the curvature of the walls of the planer chamber 4.

For better comprehension, the rotating circle diameter 15 of the planer head 3 that conventional planer cutters would occupy for conventional surface working, is also shown. Of course, the plane of the present invention may be also used in such a condition by equipping the planer head 3 with blades having a rotating circle diameter 15, in order to achieve conventional surface working wherein the workpiece is cut along a line which is parallel to the base surface 10a. Both the feed plate 8 and the discharge plate 10 would then occupy the position shown in FIG. 1, wherein the discharge plate 10 and its planer base surface 10a are tangential to the diameter 15 of the rotating circle. The chip depth would be set by means of the feed plate 8 in a known manner with the aid of the rotatable knob 11 wherein a threaded spindle moves with the knob 11 to adjust the height of the feed plate 8.

In addition to conventional surface working the plane 1 of the present invention is able to perform profiling operations by providing a planer head having a profiling blade, as will be discussed hereinafter.

Both the feed plate 8 and the discharge plate 10 are arranged for longitudinal adjustment in the direction of advance 6 and in the direction toward the planer head 3. This is attained in that the discharge plate 10 is profiled, as shown in FIG. 2, and is equipped with guide rails 16 extending inward (i.e., toward each other) on either side of the housing 2; they are positively engaging corresponding grooves 17 of the associated housing portion. This longitudinally displaceable discharge plate 10 may be moved by means of a threaded spindle 18 and a nut 19 with the aid of an adjusting wheel 20, in the direction of the arrow 6 or in the opposite direction. The threaded spindle 18 and the adjusting wheel 20 are for this purpose, mounted stationarily in the longitudinal direction but rotatingly relative to the housing 2 in a known manner, so that the nut 19 is displaced longitudinally on the threaded spindle 18 during the rotation of the latter. The nut 19 is connected by means of a joining piece 21 with the displaceable discharge plate 10, so that in response to rotation of the manual wheel 20, the plate 10 is displaced toward or away from the planer head 3.

The adjusting mechanism for the feed plate 8 has a similar configuration. As seen in FIG. 3, the feed plate 8 is also guided positively by means of projections 22 which slidably engage grooves 23 on the bottom side of the front part 2 of the housing to permit longitudinal sliding of the feed plate 8. A conventional threaded spindle 24 and an adjusting wheel 25 are used for longitudinal adjustment of the feed plate 8 in conventional fashion, and which also accommodate the vertical adjustment of the feed plate.

By means of the longitudinal displaceability of the feed plate 8 and the discharge plate 10, the chipbreaking edge 7 of the edge part 7b on the one hand, and the rear guide edge 9 of the edge part 9a, which determine the passage orifice for the cutters, may be adapted to the profile to be produced or may adapt the profile to the shape cutters being used. Advantageously, the edge parts 7b and 9a comprise a material workable by the profile cutters. Thus, the edge parts may initially be advanced toward the rotating planer head 3, so that the shape blades cut a similar profile into the edge parts 7b and 7a. Accordingly, during a subsequent cutting operation, an accurate and clean guidance and clean processing are attained in view of the chipbreaking edge 7 which is disposed at a uniform spacing relative to the cutting edges of the shape blades. For example, it may be seen in FIG. 4 that the contour 27 of the workpiece 28 to be produced has a profiled configuration corresponding to the negative of the shape of the profiling cutter edge used. By means of the aforementioned advance of the edges 7 and 9 toward the rotating planer head 3, the edges 7 and 9 also receive the contour 27, which corresponds to the negative of the profile cutters used. It should be mentioned further that the feed plate 8 may be fixed in its adjusted position relative to the planer head 3 by the tightening of a clamping nut 29, which is accessible from the bottom (FIG. 3).

Various measures may be effected to assure, during the profiling of a workpiece (for example, the shaping of molding 28 in FIG. 4), the resting of the discharge plate 10 on the workpiece, which is important for the planing process. In the embodiment shown, the discharge plate 10, as seen in FIGS. 2 and 4, has the configuration of a profiled plate equipped at the planer base 10a and the two lateral sides with grooves 30 and 31, respectively. Gibs may be inserted into selected ones of the grooves. For example, two support gibs 32 and 33 may be inserted into two grooves 30, with the height and shape of such gibs being adapted to the contour 27 of the profile to be produced. Even though in this manner the planar surface 10a is recessed (i.e., disposed above) with respect to the rotation circle diameter 14 and the tangent laid on the diameter of the planer chamber 4, the proper resting of the manual plane 1 on the workpiece may be assured in this manner. Depending on the type of shape to be produced, it is naturally also possible to omit the gib 32, if at this location the profile has no depth h, so that the planar base 10a may rest directly on the workpiece 28, which has no profile at this point. At the location of the greatest profile depth h the gib 33 is provided in the example of embodiment of FIG. 4. As a fundamental condition it can be assumed that h must be smaller than or equal to the maximum profile depth t.

Thus, the support gibs 32, 33 project below the guide surface 10a by two different distances at locations spaced transversely of the fore-aft axis (i.e., the direction of tool travel) of the tool, and thereby adapt the discharge plate to the contour of the profile cutting edge. It will be appreciated that the latter, which can be curved or linear, extend transversely and non-parallel relative to the base surface 10a.

Further possibilities to effect the guidance by means of the discharge plate in the form of a profiled plate of FIG. 4 shall be set forth in connection with FIGS. 7 to 13.

Before that, however, an embodiment according to FIG. 6 will be discussed. FIG. 6 shows initially an entirely different possibility of attaining this guidance. In FIG. 6 the discharge table 10' does not have the configuration of a profiled or shaped plate as in FIGS. 4 and 7 to 13, but rather has a continuous, smooth surface which is equipped with guide rails 16' and lateral grooves 31' and is displaceable in the longitudinal direction. In place of the grooves 30, however, here the discharge table 10' is directly associated with adjustable support pins 34 and 35 in the form of threaded pins, which move in a corresponding thread on the bottom side of the discharge plate 10'. These adjusting pins 34 and 35 may be adapted, in the manner of the gibs 32 and 33, to the depth h of the prevailing profile contour 27, so that when at least two pins 34 and 35 spaced apart in the longitudinal direction of the discharge plate 10' are used, guidance may thereby be attained. These pins may be provided on their contact side with a low friction material or with sliding skids. The essential feature rests in the provision of adjusting pins 34 and 35, adjustable in height and thus adaptable to different shapes.

Figure 7:
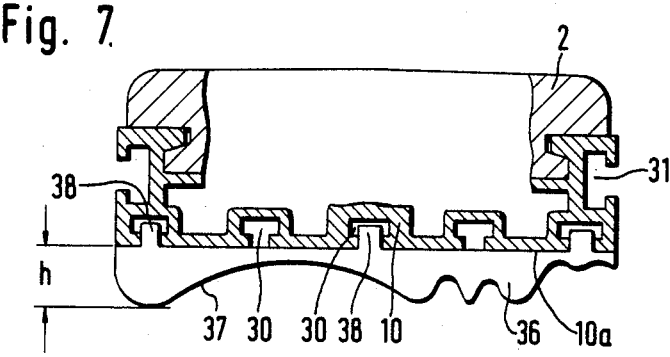
FIG. 7 depicts the planer base of FIG. 4 in the same sectional view, but with the profiled partial pieces inserted as support means.
Figure 8:
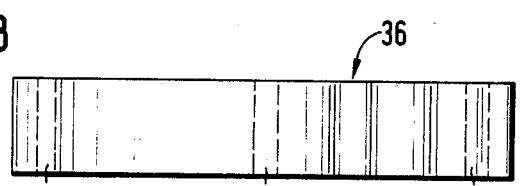
FIG. 8 depicts a top view of the inserted partial piece of FIG. 7.

FIGS. 7 and 8 show a further possibility of effecting the adaptation in height of the planer base 10a to the prevailing shape. In FIGS. 7 and 8, plate-shaped support pieces or elements 36 are attached to the discharge plate 10, said elements 36 being equipped transversely to the advance direction with a profile 37 corresponding to the contour 27 of the workpiece 28 shown in FIG. 4. By the insertion of two such pieces spaced apart along the length of the discharge plate 10, the guidance desired upon the shape produced is effected. As seen in FIG. 7, the partial pieces 36 are equipped with longitudinal ribs 38, which snap into the grooves 30 of the discharge plate 10, so that the partial pieces 37 are held securely. In place of the partial pieces 36, a suitably shaped but continuous profile plate 39 (FIGS. 11, 13) may be attached to the planer base 10a, the plate 39 having knobs 40 which snap into the longitudinal grooves 30. This plate 39 may have, for example, the shape 37 of the partial pieces 36. It may, however, possess an entirely different contour shape 41 to accommodate the profile to be produced.

Figure 9:
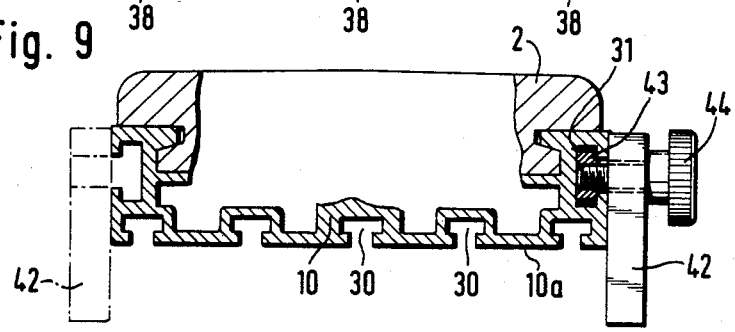
FIG. 9 depicts the sectional view through the planer base as in FIG. 4, but with laterally applied guide gibs used as support profiles.

FIG. 9 shows a possibility which differs from the modes of resting on the profile produced set forth heretofore. In FIG. 9 stationary lateral stops 42 in the form of support gibs or the like, are associated with at least one side. The gibs carry sliding pads 43 which are set into the lateral grooves 31 and securely clamped therein by means of a knurled screw 44. The bottom edge of each gib 42 may be used as a support surface which engages a surface which is a part of the profile produced or is extending parallel to the profile produced. The gib on either side can be omitted if the planer base 10a is capable of itself serving as the guiding surface, at least along a section thereof.

Figure 10:
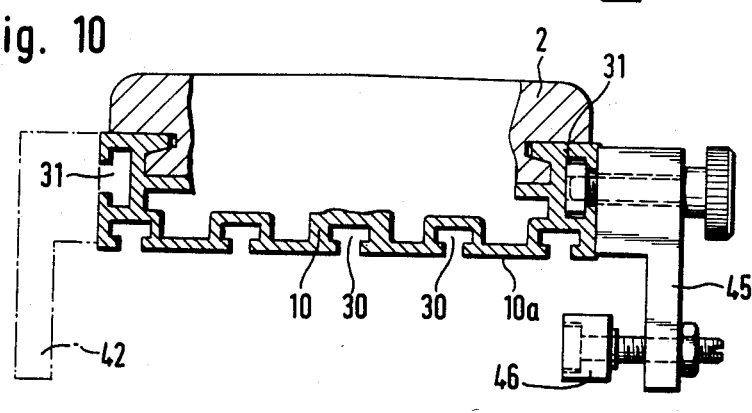
FIG. 10 is a sectional view similar to FIG. 4, but at least one laterally inserted lateral stop.

FIG. 10 illustrates the possibility that an adjustable lateral stop 45 may be clamped to the groove 31. The stop 45 is equipped with an additional stop part 46, which is adjustable transversely to the direction of advance 6. The possible modes of guiding the novel manual plane 1 may thereby be further improved.

Figure 14:
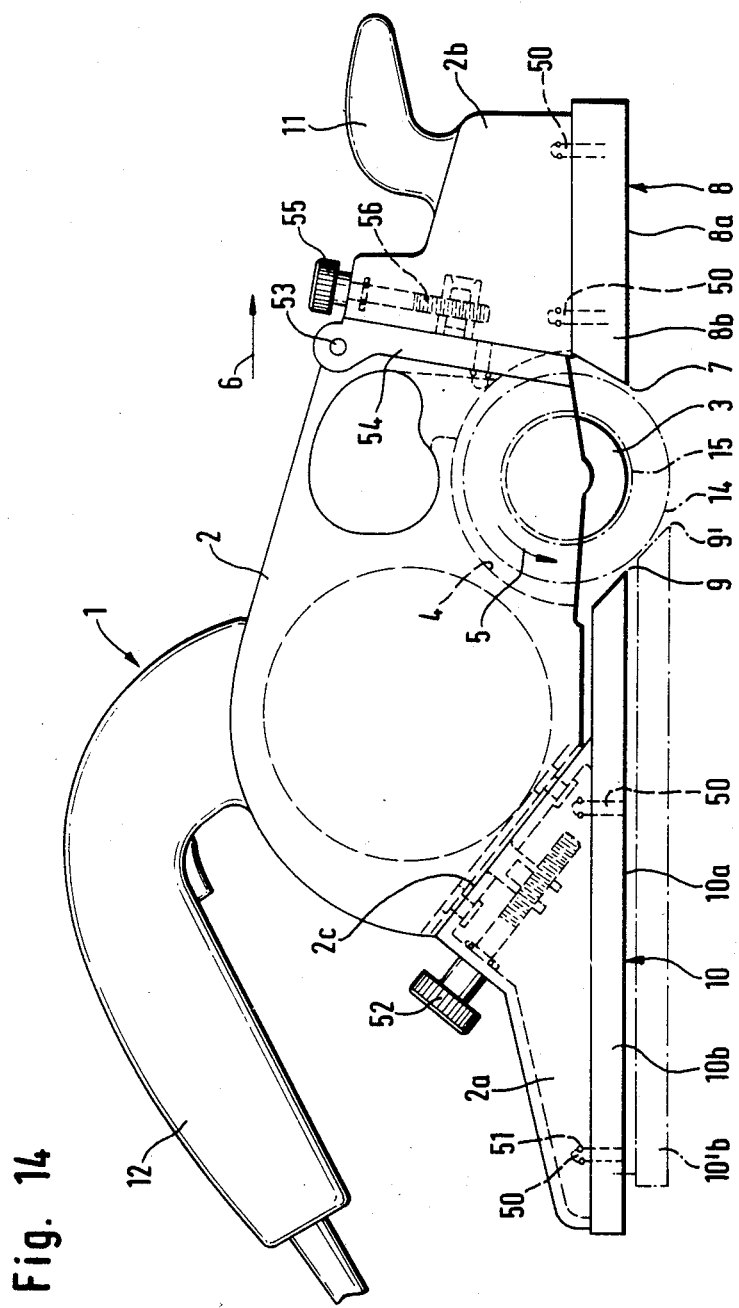
FIG. 14 is a schematic lateral view of a further embodiment of the manual planer tool with exchangeable planer bases in front of and behind the planer base.
Figure 15:
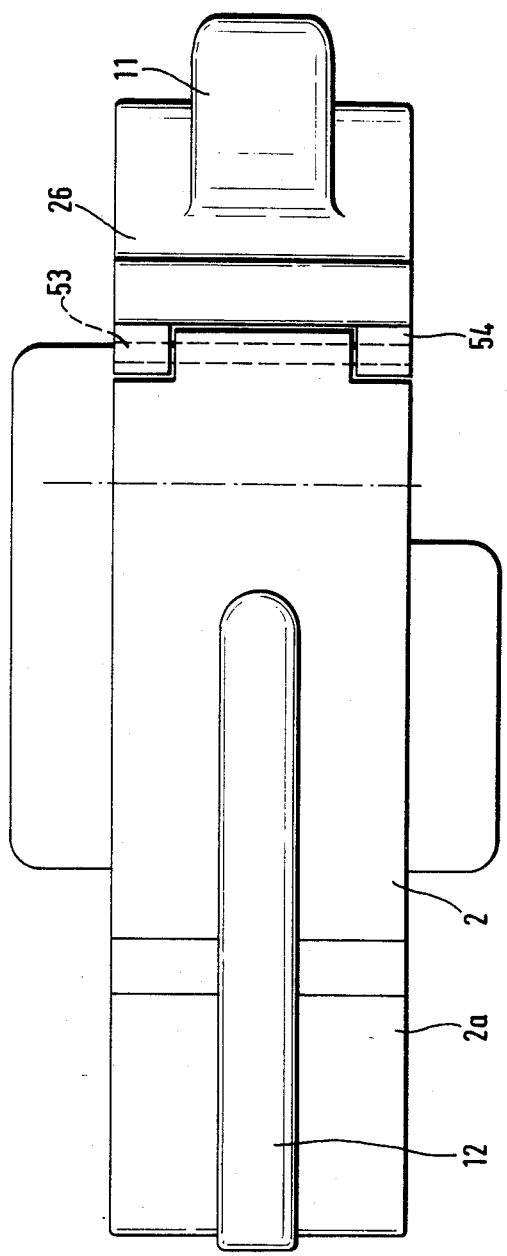
FIG. 15 is a top view of the manual planer tool of FIG. 14.
Figure 16:
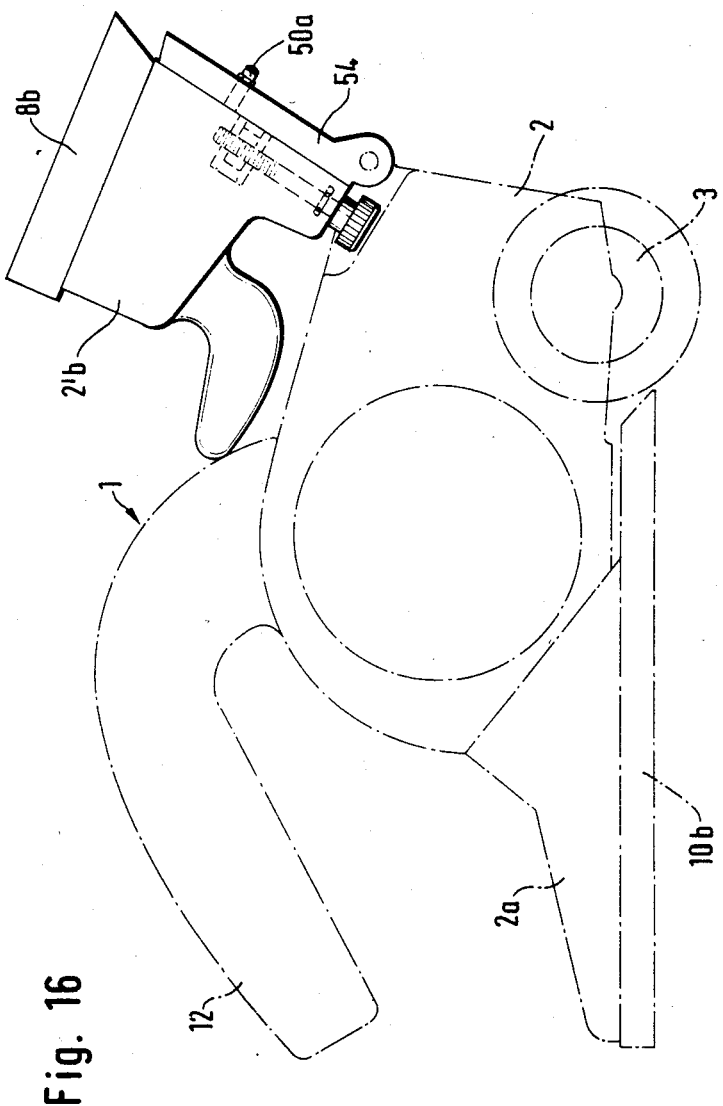
FIG. 16 is a lateral elevation of the planer tool of FIG. 14, but with the front part of the housing pivoted in the upward direction.

In FIGS. 14 to 16, parts of a manual plane 100 are guided in operation by the manual handle 12 and the guide knob 11 manually, and has planer bases 10a and 8a, respectively, guided on a workpiece. It leaves a contour transverse to the direction of advance 6 in the workpiece (not shown) corresponding in its cross-section to the negative of the profile determined by the circles of rotation (e.g., 14 and 15). In order to render possible an adequately straight guidance of the plane 100 in this process, the planer base 10a is shaped according to the profile of the planer head. In the embodiment shown in FIGS. 14–16, the entire plate 10 comprising the planer base 10a is removable from a rear part 2a of the housing. The plate 10b is secured to the part 2a of the housing by means of lock pins 50, of which, for example, four are distributed uniformly over the surface of the plate 10b. These pins 50 enter the openings in the part 2a of the housing, wherein, again in grooves, spring washers are located, engaging the grooves of the lock pins 50. The plate 10b attached to the part 2a of the housing may then be displaced along an inclined plane 2c by actuating a knurled nut 52, so that it may be moved into the position 10b', wherein its front edge occupies the position 9' to be located as close as possible to the rotating plane head 3.

A planer base 8a adapted to the profile 27 of the planer head 3 (in the example of embodiment with the rotating circle diameters 14 or 15) is formed on a plate 8b attached by means of lock pins 50 to a front part 2b of the housing. The shaping of the planer base 8a, which is not shown in detail in the example of the embodiment, has the advantage that the manual plane 100 may be guided for example along a workpiece already provided in part with a shaped groove by means of the correspondingly shaped planer base 8a of the feed table, so that for the purpose of the further processing of an already partially preprocessed profile groove, the exact guidance in the profile may be effected by means of the plane base 8a of the feed plate 8, thereby rendering possible the accurate further or final processing of the partially preprocessed profile groove.

The front part 2b of the housing may be pivoted upwardly about an axle 53 (counterclockwise) into the terminal position 2b', as shown in FIG. 16. In this position (FIG. 16), the plate 8b is removed very easily from the part 2b of the housing, even if the manual plane 100 itself should be mounted stationarily. The pivoting configuration of the front part 2b of the housing makes it possible to exchange the planer base 8a rapidly and simply by removing the entire plate 8b and replacing it with another.

As seen further in FIGS. 14 and 16, the pivoting ability of the housing part 2b is obtained in that a plate 54 is held on the main housing part 2 by a lock pin 50a, similar to the afore-mentioned lock pins 50. The plate 54 is equipped (in a manner not shown in detail) with guiding means, for example in the form of dovetails, which make it possible to adjust the front part 2b of the housing relative to the plate 54 following the actuation of the knurled nut 55 with the aid of a threaded spindle 56, so that it is possible to adjust the planer base 8a in height, thereby adapting it and its rear edge 7 to the planer head 3. In the upward pivoted state according to FIG. 16, the novel plane 100 has the advantage that concave inner contours may be worked. The rear part 2a of the housing can also be removed, so that relatively narrow concave contours may be shaped, wherein the housing 2 of the manual plane 100 conveniently is made stationary, as is known.

It will be appreciated from the foregoing description that a hand-held, rotary cutter type plane according to the present invention is capable of performing either a conventional planing operation (i.e., making a flat cut) or a profiling operation (i.e., cutting a workpie-e along an irregular (non-linear) cut line irregular in a direction transverse to the direction of movement of the plane).

Although the present invention has been described in connection with preferred embodiments thereof, it will be appreciated by those skilled in the art that additions, modifications, substitutions, and deletions may be made without departing from the spirit and scope of the invention as defined in the appended claims.

What is claimed is:

1. A hand-held planing tool comprising:
   a housing forming a generally cylindrical planer chamber therein;
   a vertically adjustable feed plate mounted on said housing at a forward side of said chamber and including a rear edge;
   vertical adjusting means for vertically adjusting said feed plate relative to said housing;
   a support member including a discharge plate mounted on said housing at a rear side of said chamber and including a front edge,
      said front and rear edges defining a downward opening of said chamber;
   a planer head mounted on said housing for rotation within said chamber about an axis extending transversely of a fore-aft axis of said housing, said axis of rotation being fixed in location relative to a lower guide surface defined by said discharge plate;
   an electric motor mounted on said housing and being operably connected to said planer head for rotating the latter;
   said chamber being sized to selectively receive one of:

a planer head having first cutting edge means for cutting a workpiece along a transverse line which is substantially parallel to said guide surface, and a planer head having second cutting edge means for cutting profiles along a transverse line which is non-parallel to said guide surface, said second cutting edge means having a maximum outer diameter which is greater than a diameter of said first cutting edge means;

said guide surface being disposed substantially tangentially relative to a diameter of said first cutting edge means;

means for adjusting said feed plate in said fore-aft direction relative to said housing independently of said vertical adjusting means to adjust said rear edge relative to the cutting edge means of the planer head, and means for adjusting said discharge plate in said fore-aft direction relative to said housing to adjust said front edge relative to the cutting edge of the planer head, said rear edge of said feed plate having a contour corresponding to the contour of the cutting edge means of the planer head, said feed plate including a main part securable to said housing and an exchangeable part carrying said rear end of said main part, said exchangeable part carrying said rear edge and being exchangeable so that said rear edge can be adapted to the contours of the first and second cutting edge means.

2. A hand-held planing tool according to claim 1, wherein said exchangeable part is formed of a material that is workable by the cutting edge means of said planer head.

3. A hand-held planing tool according to claim 1, wherein said planer head having said second cutting edge means is mounted in said chamber, said second cutting edge having an irregular contour, said rear edge having an irregular contour corresponding to said irregular contour of said second cutting edge.

4. A hand-held planing tool according to claim 1 including adapter means for adapting said support member to the profile of said second cutting edge means comprising removable supporting means projecting below said guide surface at locations spaced transversely of said fore-aft axis.

5. A hand-held planing tool according to claim 4, wherein said adapter means is mounted on said discharge plate.

6. A hand-held planing tool according to claim 5, wherein said supporting means comprise a plurality of shaped pieces mounted in recesses in said support member.

7. A hand-held planing tool according to claim 6, wherein said recesses comprise longitudinal grooves extending in the fore-aft direction.

8. A hand-held planing tool according to claim 7, wherein said adapter means comprise a plurality of elements, each extending transversely of the fore-aft axis and each having a contour corresponding to the contour of said second cutting edge means.

9. A hand-held planing tool according to claim 5, wherein said supporting means comprise a plurality of adjustable pins which project perpendicularly relative to said guide surface.

10. A hand-held planing tool according to claim 9, wherein said adjustable pins comprise threaded pins.

11. A hand-held planing tool according to claim 4, wherein said supporting means comprises a bottom surface depending from said support member, said surface having a contour corresponding to the contour of said second cutting blade means and extending substantially the full length and width of said discharge plate.

12. A hand-held planing tool according to claim 11, wherein said supporting surface is detachable from said support member and is securable thereto by means of lock fasteners.

13. A hand-held planing tool according to claim 1, including additional adapter means for adapting said feed plate to the profile of said second cutting edge means causing additional supporting means projecting downwardly from said feed plate at locations spaced transversely of said fore-aft axis.

14. A hand-held planing tool according to claim 13, wherein said housing includes a front part which carries said feed plate, said front part being mounted for upward pivotal movement.

15. A hand-held planing tool according to claim 14, including a mounting part attached to said front part of said housing and pivotally connected to the remainder of said housing, and connecting means for securing said mounting plate to said remainder of said housing.

16. A hand-held planing tool according to claim 1, wherein said housing includes a center portion having a surface inclined relative to vertical, and a rear part which carries said support member; said rear part including an inclined surface which slides along said inclined surface of said center part.

17. A hand-held planing tool according to claim 4, wherein said removable supporting means project below said guide surface by at least two different distances corresponding to different depths of the profile being cut.

* * * * *